United States Patent [19]
Krueger et al.

[11] 4,256,377
[45] Mar. 17, 1981

[54] PROCESS FOR PRODUCING HOMEOTROPIC ORIENTATION LAYERS FOR LIQUID CRYSTAL DEVICES AND THE RESULTANT LIQUID CRYSTAL DEVICES

[75] Inventors: Hans Krueger, Munich; Hans Pink, Starnberg, both of Fed. Rep. of Germany

[73] Assignee: Siemens Aktiengesellschaft, Berlin & Munich, Fed. Rep. of Germany

[21] Appl. No.: 907,003

[22] Filed: May 18, 1978

[30] Foreign Application Priority Data

May 20, 1977 [DE] Fed. Rep. of Germany ....... 2722900

[51] Int. Cl.² .............................................. G02F 1/13
[52] U.S. Cl. ...................... 350/340; 350/320
[58] Field of Search ............... 350/339, 340, 341, 320

[56] References Cited

U.S. PATENT DOCUMENTS

| | | | |
|---|---|---|---|
| 3,938,242 | 2/1976 | Sussman | 350/341 X |
| 4,139,273 | 2/1979 | Crossland et al. | 350/340 |
| 4,150,877 | 4/1979 | Kobale et al. | 350/341 |

*Primary Examiner*—Edward S. Bauer
*Attorney, Agent, or Firm*—Hill, Van Santen, Steadman, Chiara & Simpson

[57] ABSTRACT

A homeotropic orientation layer for a liquid crystal cell is produced by forming an organic liquid solution containing a suitable amount of Si and Me to provide a necessary ratio of such elements to correspond to a chemical composition defined by the formula:

$$(Me_2O_3)_{1-x}(SiO_y)_x$$

wherein Me is an element selected from the group consisting of Al and Cr, x is a numeral at least equal to 0 and smaller than 1, and y is a numeral at least equal to 1.9 and not more than 2; applying a layer of such organic solution onto at least one face of a liquid crystal cell substrate, which may have a conductive layer thereon, and transferring such layer of organic solution into a solid homeotropically orientating layer by thermal decomposition of the organic solution, as by heating the solution-coated substrate at a temperature in the range of about 100° to 550° C. for a period of time ranging from about 10 to 30 minutes.

21 Claims, 1 Drawing Figure

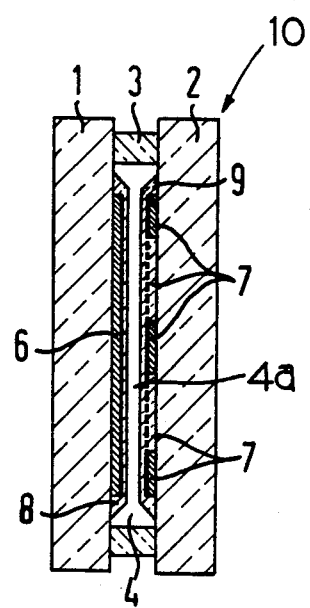

PROCESS FOR PRODUCING HOMEOTROPIC ORIENTATION LAYERS FOR LIQUID CRYSTAL DEVICES AND THE RESULTANT LIQUID CRYSTAL DEVICES

BACKGROUND OF THE INVENTION

1. Field of the Invention

The invention relates to liquid crystal display device and somewhat more particularly to a process of producing homeotropic orientation layers for use in such devices and the resultant liquid crystal devices.

2. Prior Art

Molecules of liquid crystal layers must be aligned at essentially right angles with an associated carrier or substrate plate in an unactivated or rest state ("homeotropically") for a number of practical applications, such as, for example, in a liquid crystal display device having dynamic scattering or one based on specific field effects (i.e., "DAP-effect", "phase-change effect", etc.). Heretofore numerous different techniques have been developed to provide homeotropic orientation in liquid crystal layers, however, while at least certain of such techniques provide serviceable and generally reproduceable results, they are nevertheless complicated and are only marginally useful for large-scale production. A summary of various, currently utilized orientation techniques is set forth in an article by L. A. Goodman, "Liquid-Crystals-Packaging and Surface Treatments", RCA Review, Vol. 35, Sept. 1974, pages 447-461. In spite of intensive efforts by workers in this art, no effective satisfactory molecular alignment or orientation techniques for liquid crystals has yet been discovered and that may be associated with the fact that the actual orientation mechanisms are not yet fully and/or completely understood so that, as before, one is left to more or less plausible suppositions.

If a liquid crystal layer is electrically activated, such a layer must be protected from any D.C. voltage, which as is known, decomposes liquid crystals. Accordingly, the electrodes of a liquid crystal display device are generally coated with an insulating layer since in virtually all liquid crystal activation techniques, specific D.C. voltage components are unavoidable. An insulating layer or coating of this type must satisfy a series of requirements: it must posses a very high electrical resistance and must be capable of forming a substantially pore-free film which adheres to various types of materials, such as the materials of a substrate or an electrode; it must be mechanically, thermally and chemically stable and must transmit as much light as possible; and, not the least, it must be capable of being economically produced. A layer which simultaneously exhibits a homeotropically orientating function and an electrical insulating function would be substantially ideal.

Insulating layers composed of $SiO_2$ have, in the past, proven to be capable of meeting some of the aforesaid requirements. However, $SiO_2$ orientates liquid crystal materials, if at all, only in a plate-parallel fashion ("homogeneously"). If a plate-perpendicular or homeotropic molecular alignment is required and if it is not desired to dispense with the $SiO_2$, which, in other respects, is so-favorable, the $SiO_2$ surface would have to be silanized (i.e. provided with a layer of silanol) and/or the liquid crystal layer would have to be admixed with some other orientation means. This type of procedure is extremely complicated and is certainly not beneficial to the quality of the resultant liquid crystals. A further disadvantage of this type of procedure is that the disruptive reflections from a double layer consisting of $SiO_2$ and silanol groups can only be avoided by careful matching of layer thicknesses, which is difficult to achieve.

German Auslegesschrift No. 2,313,730 (which generally corresponds to U.K. Patent Specification No. 1,428,700) states that a $SiO_2$ or $TiO_2$ layer positioned between an electrode and a carrier plate of a liquid crystal display device provides homeotropic orientaion via specific surface treatment (i.e. etching away portions of the overlying conductive layer). Apart from the fact that such specific surface treatment process represents an additional operational step, the so-produced orientation effect does not appear to be readily reproduceable.

SUMMARY OF THE INVENTION

The invention provides a process for producing a homeotropically orientating layer in a particularly simple and reliable manner so that such layer is stable over an extended period of time and exhibits a highly insulating effect and which also has other favorable properties, comparable to a $SiO_2$ layer.

In accordance with the principles of the invention, a homeotropically orientated layer of this type is produced by forming an organic liquid solution containing a suitable amount of Si and Me to provide a necessary ratio of such elements to correspond to a chemical composition defined by the formula:

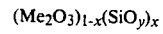

$$(Me_2O_3)_{1-x}(SiO_y)_x$$

wherein Me is an element selected from the group consisting of Al and Cr, x is a numeral at least equal to 0 and smaller than 1 (i.e. $0 \leq x < 1$), and y is a numeral at leat equal to 1.9 and not more than 2 (i.e. $1.9 \leq y \leq 2$); applying a layer of such solution onto at least one face of a liquid crystal cell carrier plate or substrate (which may, and preferably does, have a conductive layer thereon); and transforming the so-applied layer of solution into an orientation-insulation layer by thermal decomposition of the solution whereby the resultant solid layer has a chemical composition corresponding to the above formula.

While good results are obtained from orientation-insulating layers of the invention having compositions wherein $0 < x < 1$, in many instances, it is advisable to limit the compositions thereof to compositions wherein $0 < x \leq 0.8$ and more preferably to compositions wherein $0 < x \leq 0.5$ or $0.9 \leq x < 1$. Generally, the silicon oxide within such layer will consist of $SiO_2$ but silicon oxides having y-values (per the earlier described formula) somewhat below 2 and, in individual circumstances, even somewhat greater than 2 may also be utilized in the practice of the invention. In addition to the oxides, $Me_2O_3$ and $SiO_y$, the orientation layers of the invention may frequently also contain specific amounts of hydrides, particularly when the originally contained water has not been completely split away from the silicon oxide.

The organic solution may be applied particularly economically by submerging in a substrate therein or by spraying such solution onto select surfaces of a substrate. The fact that the carrier or substrate is coated on both sides, as when submerged into a solution, has a favorable effect inasmuch as the substrate shape remains stable during the subsequent thermal treatment (i.e. no warping occurs).

In the afore referenced German Auslegesschrift No. 2,313,730, an intermediate layer is likewise produced by submerging a substrate in a solution containing specific metal compounds and then thermally treating the so-coated substrate. However, this reference is limited exclusively to Si and Ti compounds and the application techniques there described do not appear to consistently produce the desired orientation effect.

Orientation layers (which in fact comprise orientation-insulation layers) produced in accordance with the principles of the invention are extremely stable and, as has been confirmed by long term tests, provide a permanently homeotropic orientating effect without the need of any additional measures. Surprisingly, this stable orientation effect is also exhibited by $Me_2O_3$—$SiO_y$ layer having a relatively small amount of the $Me_2O_3$ component therein, for example only a few weight percent (i.e., about 2 to 10 wt.%) of $Al_2O_3$ (which, in fact, would be expected to produce a plate-parallel molecular alignment). The solid body orientation layers produced in accordance with the principles of the invention are virtually pin-hole free and thus protect a liquid crystal layer in contact therewith very effectively from chemical and/or electrolytical disturbance or decomposition. A further advantage of the invention, which must not be underestimated, is that these orientation layers can be easily and satisfactorily applied even to large area surfaces, and, in contrast to virtually pure $SiO_2$ layers, can be thermally and optically matched to the characteristics of the relevant substrate by selecting suitable compositions within relatively wide limits for the solution forming the orientation layer.

In accordance with the principles of the invention, an organic liquid solution containing suitable amounts of Si and Me to provide the necessary ratio of such elements to correspond to the chemical formula:

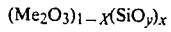
$$(Me_2O_3)_{1-x}(SiO_y)_x$$

wherein Me, x and y are as defined earlier, is utilized to provide a layer of such solution to a select substrate surface, which is then thermally converted to the orientation-insulation layer of the invention. Particularly useful solutions for use in the practice of the invention are those which contain a solvent for Si and Me, which solvent may be selected from the group consisting of relatively low molecular weight carboxylic acids (preferably monocarboxylic acids), relatively low molecular weight alcohol (preferably monohydroxyl alcohols), esters of such carboxylic acids and alcohols and mixtures thereof. In addition, particularly useful solutions for use in the practice of the invention are those which contain relatively low molecular weight carboxylic acid compounds of Si and Me and/or those which contain Si and Me as metal halides whose anions are at least partially substituted by radicals of the aforesaid relatively low molecular weight carboxylic acids, or such metal halides whose anions are at least partially substituted by relatively low molecular weight carboxylic acid radicals and by hydroxyl radicals or by radicals of the aforesaid relatively low molecular weight alcohols. Preferably, the aforesaid relatively low molecular weight alcohols and carboxylic acids comprise $C_1$ to $C_4$ alcohols and acids.

DESCRIPTION OF THE DRAWINGS

The FIGURE is an enlarged, somewhat schematic, cross-sectional view of a liquid crystal cell incorporating the principles of the invention therein.

DESCRIPTION OF THE PREFERRED EMBODIMENTS

The principles of the invention are particularly useful in providing liquid crystal display devices of the dynamic scattering type, such as a digital display device generally indicated at 10 in the FIGURE. The display device 10 is comprised of two carrier or substrate plates 1 and 2, which are maintained at a predetermined spacing or distance from one another by a surrounding frame 3. A cavity or chamber 4 is formed or defined by the inner surface of the carrier plates 1 and 2 and the frame 3. A layer 4a of a suitable liquid crystal material (which is known per se and is commercially available) is positioned within cavity 4. The respective carrier plates 1 and 2 are provided with conductive coatings (which are known per se) on their inner surfaces (i.e. the surfaces thereof which face one another), with plate 1 being provided with a continuous coating 6, which forms a rear electrode and plate 2 being provided with a discontinuous or segmented coating 7, which forms a front electrode. The respective electrodes are each provided with a respective continuous orientation-insulation layers 8 and 9.

In an exemplary embodiment, the two carrier plates 1 and 2 were comprised of a soft glass and the frame 3 was comprised of a glass solder having a relatively low melting point. The conductive coatings 6 and 7 were comprised of an antimony-doped tin oxide while the orientation-insulation layers 8 and 9 were comprised of a mixture of $SiO_2$ having about 7 weight percent of $Al_2O_3$ therein. While the orientation-insulation layers 8 and 9 may have a thickness ranging from between about 300 Å to 3000 Å, in the preferred exemplary embodiment hereunder discussion, such layers had a thickness ranging between about 1500 Å to 2000 Å.

In an exemplary process for producing the orientation-insulation layers of the invention, suitable carrier plates having finished electrodes on a surface thereof were submerged in an organic liquid solution containing a solvent comprised of an ester, such as formed by an organic monocarboxylic acid, i.e. acetic acid, and a relatively low molecular weight alcohol, i.e., ethanol along with select Si/Me organic compounds therein, such as $Si(CH_3COO)_4$ and $Al(CH_3COO)_3$ and then withdrawn from such solution at a relatively constant rate (the withdrawal rate and the actual concentration of the Si/Me compounds in the solvent determines the thickness of the finished orientation-insulation layer). The so-coated carrier plates were then dried at temperatures of about 180° C. for about 10 minutes and then exposed to elevated heat of about 500° C. for about 30 minutes. During the heating step, the two carrier plates were simultaneously secured to one another by end vitrification with a suitable frame member.

The requisite pyrolysis or heat treatment may occur over relatively wide temperature ranges (generally ranging from about 100° to 500° C.) and over relatively wide time periods (generally ranging between about 10 to 45 minutes). Preferably, the heat treatment process occurs at temperatures between about 400° to 500° C. over relatively brief periods of time of about 20 to 30 minutes, since with increased treatment temperatures, the orientation-insulation layer structure becomes more solid and a satisfactory coating can be formed even on rough bases, which are generally subject to faults.

As will be appreciated, the invention is not limited to the exemplary embodiments set forth. Thus, a worker is free, within the scope of the invention, to select a suitable organic solution composition which is most suitable for particular circumstances in order to attain a particular orientation-insulation layer composition.

For example, the organic solution may contain a solvent comprised of one part ethyl acetate and one part ethanol or the solvent may comprise relatively pure ethanol. Further, suitable Me - or Si - compounds may comprise acetates, such as $Al(CH_3COO)_3$, $Cr(CH_3OO)_3$ or $Si(CH_3COO)_4$. A suitable solution for depositing an oxide layer composed of, for example, $(Al_2O_3)_{0.5}(SiO_2)_{0.5}$ may be produced, for example, by combining two parts of a solution of 100 m. mol $Al_2(CH_3COO)_3$ in 500 ml of $C_2H_5OH$ with one part of a solution of 100 m. mol $Si(CH_3COO)_4$ in 500 ml of a mixture of 250 ml of $CH_3COOC_2H_5$ and 250 ml of $C_2H_5OH$. Further, suitable Me - or Si - metal halides whose anions are partially substituted by acid radicals of low molecular weight monocarboxylic acids and hydroxyl radicals are exemplified by materials such as $AlOHCl(CH_3COO)$ or $SiOHCL(CH_3COO)_2$; whereas such metal halides whose anions are partially substituted by alcohol radicals of low molecular weight alcohols may be exemplified by materials such as $AlCl(C_2H_5O)_2$ or $SiCl(C_2H_5O)_3$. These various organo-metallic compounds used in the practice of the invention are known in the art so that synthesis routes, etc., need not be discussed.

Further, in a liquid crystal display, it is not always necessary to coat the inner surfaces of both carrier plates or substrates with an orientation-insulation layer of the invention since liquid crystal material is protected from a D.C. flow even when only one electrode of such display is coated with the orientation-insulation layer of the invention. In such instances, the molecular orientation at the boundary surface free of the orientation-insulation layer would have to be provided in some other manner. Also, one could apply the orientation-insulation layer of the invention to an electrode-free substrate surface, for example, in instances of liquid crystal display devices wherein the imaging contrast is produced by thermal controls.

As is apparent from the foregoing specification, the present invention is susceptible of being embodied with various alterations and modifications which may differ particularly from those that have been described in the preceding specification and description. For this reason, it is to be fully understood that all of the foregoing is to be merely illustrative and is not to be construed or interpreted to being restrictive or otherwise limiting in the present invention, excepting as it is set forth and defined in the hereto-appended claims.

We claim as our invention:

1. A process of producing a homeotropically orientating layer on a liquid crystal cell substrate, comprising:
   forming an organic liquid solution containing a suitable amount of Si and Me to provide a necessary ratio of such materials to form an orientation layer having a chemical composition defined by the formula:

$(Me_2O_3)_{1-x}(SiO_y)_x$ wherein Me is an element selected from the group consisting of Al and Cr, x is a numeral greater than 0 and smaller than 1, and y is a numeral at least equal to 1.9 and not more than 2;
   applying a layer of said organic solution onto at least one face of a liquid crystal cell substrate; and
   transforming said layer of organic solution into a solid homeotropically orientating layer having said chemical composition by thermal decomposition of said organic solution.

2. A process as defined in claim 1 wherein applying said layer of organic solution to said substrate face is accomplished by submerging at least said substrate face into said organic solution.

3. A process as defined in claim 1 wherein applying said layer of organic solution to said substrate face is accomplished by spraying said solution onto said substrate face.

4. A process as defined in claim 1 wherein said substrate face, prior to said layer of organic solution being applied thereto, is provided with a conductive layer.

5. A process as defined in claim 1 wherein said organic solution contains a solvent for Si and Me, said solvent being selected from the group consisting of relatively low molecular weight monocarboxylic acids, relatively low molecular weight alcohols, esters of such acids and alcohols and mixtures thereof.

6. A process as defined in claim 5 wherein said relatively low molecular weight monocarboxylic acids and relatively low molecular weight alcohols are comprised of $C_1$ to $C_4$ alcohols and acids.

7. A process as defined in claim 1 wherein said organic solution contains relatively low molecular weight monocarboxylic acid compounds of Si and Me.

8. A process as defined in claim 7 wherein said relatively low molecular weight monocarboxylic acids and relatively low molecular weight alcohols are comprised of $C_1$ to $C_4$ alcohols and acids.

9. A process as defined in claim 1 wherein said organic solution contains Si and Me metal halides whose anions are at least partially substituted by relatively low molecular weight monocarboxylic acid radicals.

10. A process as defined in claim 9 wherein said relatively low molecular weight monocarboxylic acids and relatively low molecular weight alcohols are comprised of $C_1$ to $C_4$ alcohols and acids.

11. A process as defined in claim 1 wherein said organic solution contains Si and Me metal halides whose anions are at least partially substituted by materials selected from the group consisting of (a) relatively low molecular weight monocarboxylic acid radicals and hydroxy radicals and (b) relatively low molecular weight alcohol radicals.

12. A process as defined in claim 11 wherein said relatively low molecular weight monocarboxylic acids and relatively low molecular weight alcohols are comprised of $C_1$ to $C_4$ alcohols and acids.

13. A process as defined in claim 1 wherein x is a numeral greater than 0 and not more than 0.8.

14. A process as defined in claim 1 wherein x is a numeral greater than 0 and not more than 0.5.

15. A process as defined in claim 1 wherein x is a numeral at least equal to 0.9 but less than 1.

16. A process as defined in claim 1 wherein said transforming said organic solution layer into said orientation layer includes heating said solution layer at a temperature ranging from about 100° to 550° C.

17. A process as defined in claim 1 wherein said orientation layer is composed of a mixture of $SiO_2$ and about 7 weight percent $Al_2O_3$.

18. A homeotropically orientating layer produced via the process defined in claim 1 and positioned within an operable liquid crystal display device.

19. In an operational liquid crystal display device having a pair of spaced carrier plates with inner surfaces thereof forming a cavity, at least one of said inner surfaces having a conductive coating thereon and a liquid crystal within said cavity, the improvement comprising wherein:
   a homeotropically orientating layer is positioned on at least said conductive coating, said orientating layer consisting essentially of a chemical composition defined by the formula:

$$(Al_2O_3)_{1-x}(SiO_y)_x$$

wherein x is a numeral greater than 0 and less than 1, and y is a numeral at least equal to 1.9 and not greater than 2.

20. In an operational liquid crystal display device having a pair of spaced carrier plates with inner surfaces thereof forming a cavity, at least one said inner surfaces having a conductive coating thereon and a liquid crystal within said cavity, the improvement comprising wherein:
   a homeotropically orientating layer is positioned on at least said conductive coating, said orientating layer consisting essentially of a chemical composition defined by the formula:

$$(Cr_2O_3)_{1-x}(SiO_y)_x$$

wherein x is a numeral greater than 0 and less than 1, and y is a numeral at least equal to 1.9 and not greater than 2.

21. In an operational liquid crystal display device having a pair of spaced carrier plates with inner surfaces thereof forming a cavity, at least one of said inner surfaces having a conductive coating thereon and a liquid crystal within said cavity, the improvement comprising wherein:
   a homeotropically orientating layer is positioned on at least said conductive coating, said orientating layer consisting essentially of a chemical composition defined by the formula:

$$(Me_2O_3)_{1-x}(SiO_y)_x$$

wherein Me is an element selected from the group consisting of Al and Cr, x is a numeral greater than 0 and less than 1, and y is a numeral at least equal to 1.9 and not greater than 2.

* * * * *